T. E. MURRAY, Jr.
METHOD OF ELECTRICALLY MAKING OPENINGS OF DESIRED CONFIGURATION IN METAL PLATES.
APPLICATION FILED OCT. 10, 1917.
1,252,147.   Patented Jan. 1, 1918.
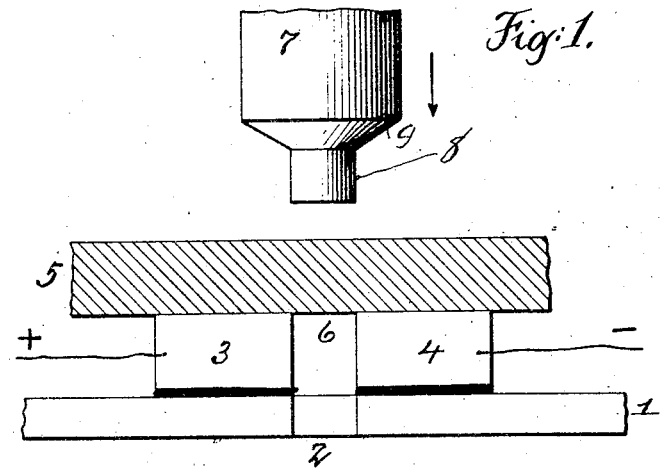
Fig. 1.
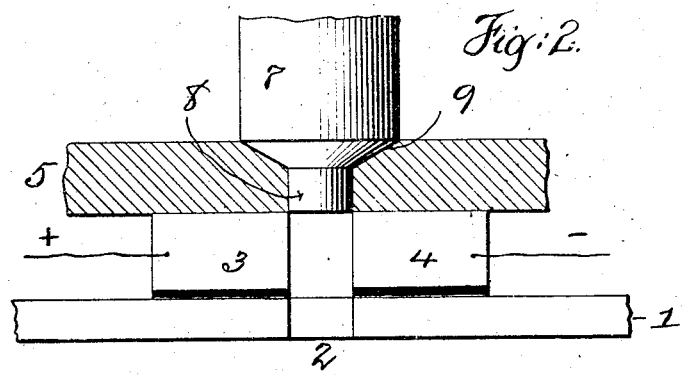
Fig. 2.
Fig. 3.
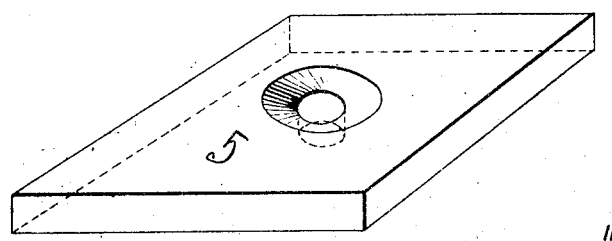
INVENTOR
Thomas E. Murray Jr.
BY
His ATTORNEY

UNITED STATES PATENT OFFICE.

THOMAS E. MURRAY, JR., OF BROOKLYN, NEW YORK.

METHOD OF ELECTRICALLY MAKING OPENINGS OF DESIRED CONFIGURATION IN METAL PLATES.

1,252,147.   Specification of Letters Patent.   Patented Jan. 1, 1918.

Application filed October 10, 1917. Serial No. 195,738.

*To all whom it may concern:*

Be it known that I, THOMAS E. MURRAY, Jr., a citizen of the United States, residing at Brooklyn, in the county of Kings and State of New York, have invented a certain new and useful Improvement in Methods of Electrically Making Openings of Desired Configuration in Metal Plates, of which the following is a specification.

The invention is a method of electrically making an opening of desired configuration in a metal plate. I herein illustrate an opening having a cylindrical portion and a flared or countersunk portion, and hence suitably shaped to receive a headed rivet, whereby said plate may be secured to another plate, or to any suitable support.

In the accompanying drawings—

Figure 1 is a vertical section showing the plate or block in which a countersunk opening is to be made, the electrodes and forming tool being shown in elevation, and said tool being in raised position. Fig. 2 is a similar view, showing the tool in lowered position to form the countersunk opening. Fig. 3 is a perspective view of the plate with the countersunk hole made therein.

Similar numbers of reference indicate like parts.

1 is any suitable support or table, having an opening 2. On said table and insulated therefrom are electrodes 3, 4, preferably of copper or other metal of high heat conductibility. The plate 5 in which the opening of desired configuration, here a countersunk hole, is to be made, is placed upon said electrodes so as to cover the space 6 between them, said space being directly above the opening 2 in table 1.

The forming tool 7 has its lower extremity 8 shaped to correspond to the cylindrical portion of the countersunk hole, and its adjacent portion 9 flared or frusto-conical to correspond to the countersink. Said tool is to be vertically movable.

The operation is as follows: Current being established, that portion of the metal plate 5 which bridges the space 6 becomes highly heated, and so plastic. The forming tool is then caused to descend, and by reason of the plasticity of the metal, seats itself in the body of the plate, as shown in Fig. 2, forcing out the displaced metal through the space 6 and table opening 2. The tool is then raised and the heating current interrupted, leaving the plate with a countersunk hole in it, as shown in Fig. 3.

I claim:

1. The method of making an opening of predetermined configuration in a metal plate, which consists in electrically heating said plate to a plastic condition, embedding therein a tool of varying cross sectional area and of configuration corresponding to the desired configuration of said opening, and then withdrawing said tool.

2. The method of making a countersunk hole through a metal plate, which consists in electrically heating said plate to a plastic condition, embedding therein a tool of configuration corresponding to said countersunk hole, and then withdrawing said tool.

In testimony whereof I have affixed my signature in presence of two witnesses.

THOMAS E. MURRAY, JR.

Witnesses:
GERTRUDE T. PORTER,
MAY T. McGARRY.